(12) United States Patent
Tetrick

(10) Patent No.: US 7,827,352 B2
(45) Date of Patent: Nov. 2, 2010

(54) LOADING DATA FROM A MEMORY CARD

(75) Inventor: R. Scott Tetrick, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 401 days.

(21) Appl. No.: 11/857,289

(22) Filed: Sep. 18, 2007

(65) Prior Publication Data

US 2009/0077316 A1 Mar. 19, 2009

(51) Int. Cl.
*G06F 12/00* (2006.01)
(52) U.S. Cl. .................................. 711/115
(58) Field of Classification Search .......... None
See application file for complete search history.

(56) References Cited

U.S. PATENT DOCUMENTS

| | | | |
|---|---|---|---|
| 5,487,161 A * | 1/1996 | Koenck et al. | 711/115 |
| 6,665,744 B2 * | 12/2003 | Shimamoto | 710/15 |
| 6,748,548 B2 * | 6/2004 | Bormann et al. | 713/323 |
| 2003/0074179 A1 * | 4/2003 | Ropo et al. | 703/27 |
| 2004/0103234 A1 * | 5/2004 | Zer et al. | 710/301 |
| 2004/0108384 A1 * | 6/2004 | Wang et al. | 235/492 |
| 2005/0055591 A1 * | 3/2005 | Cho | 713/320 |
| 2007/0260358 A1 * | 11/2007 | Katoh | 700/286 |
| 2008/0148083 A1 * | 6/2008 | Pesavento et al. | 713/322 |

* cited by examiner

*Primary Examiner*—Hiep T Nguyen
(74) *Attorney, Agent, or Firm*—B Delano Jordan; Jordan Law LLC

(57) ABSTRACT

A memory card detection method comprising detecting insertion of a memory card into a device's card slot; creating a memory card construct in a non-volatile memory storage; copying data from the memory card to the memory card construct; and informing the device that a new memory card has been inserted and may be accessed from the non-volatile memory storage.

4 Claims, 3 Drawing Sheets

LOADING DATA FROM A MEMORY CARD

FIELD OF INVENTION

This invention relates generally to memory cards in a computing environment and, more particularly, to the intelligent detection of memory cards using non-volatile memory.

BACKGROUND

Memory cards are used primarily for data storage in electronic devices such as digital cameras, computers, telephones, music players, and video game consoles. Devices that have memory card capabilities have card slots where memory cards may be inserted. Once a memory card is inserted into a card slot on a device, the device may access the memory card through the card slot.

BRIEF DESCRIPTION OF THE DRAWINGS

Embodiments of the invention are understood by referring to the figures in the attached drawings, as provided below.

Features, elements, and aspects of the invention that are referenced by the same numerals in different figures represent the same equivalent, or similar features, elements, or aspects, in accordance with one or more embodiments.

DETAILED DESCRIPTION OF EXEMPLARY EMBODIMENTS

Figure 1:
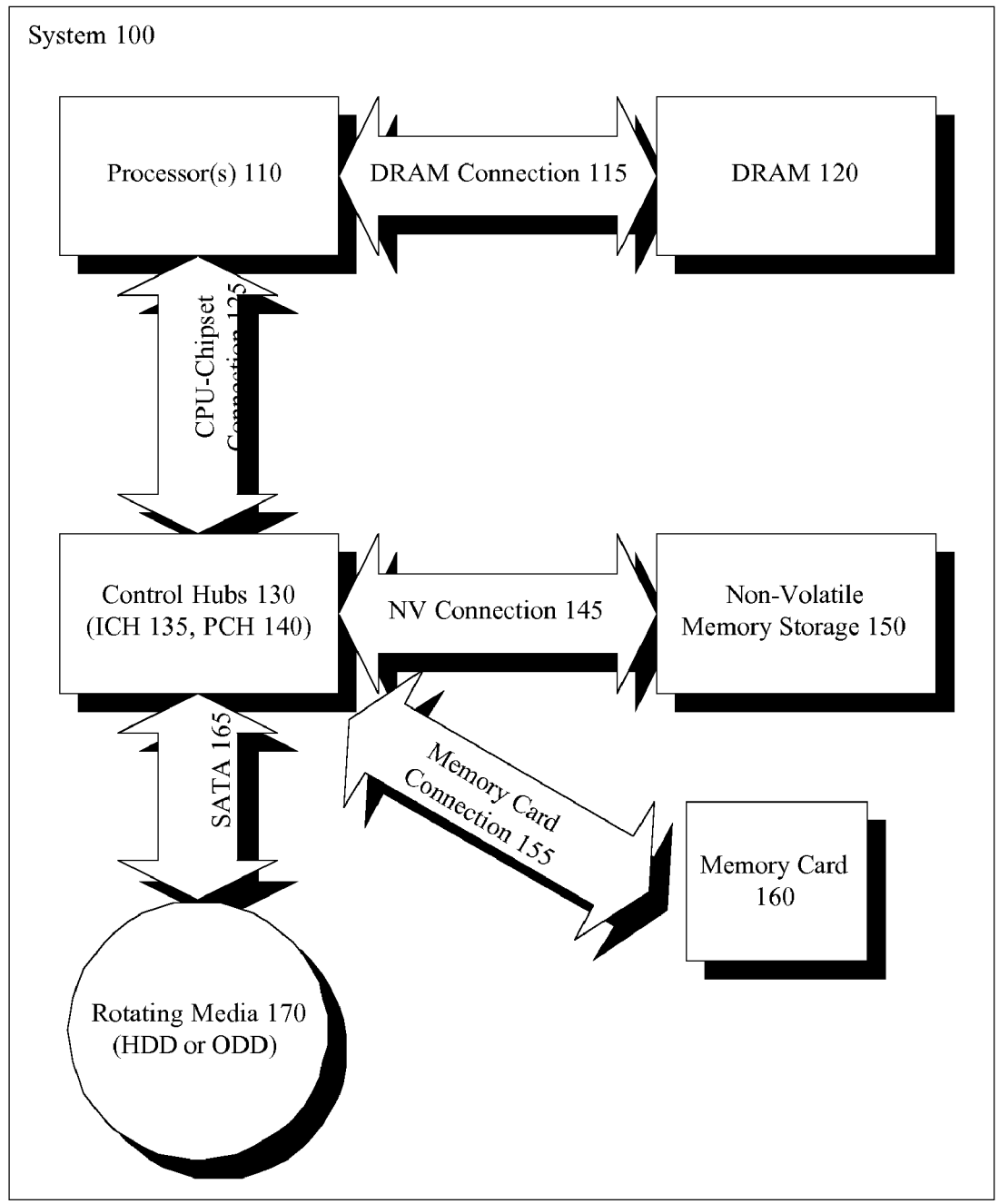
FIG. 1 is a block diagram of the system's components in an exemplary computing system, in accordance with one embodiment.

The present disclosure is directed to systems and corresponding methods that load data from memory cards to non-volatile memory.

In the following, numerous specific details are set forth to provide a thorough description of various embodiments of the invention. Certain embodiments of the invention may be practiced without these specific details or with some variations in detail. In some instances, certain features are described in less detail so as not to obscure other aspects of the invention. The level of detail associated with each of the elements or features should not be construed to qualify the novelty or importance of one feature over the others.

When a memory card is inserted into a card slot of a fully operational system, the system may communicate with the card slot through one or more control hubs. The device may load the data on the memory card onto disk (e.g. hard disk drive) or into system memory (e.g. DRAM) and then immediately detects the memory card.

Reading data directly from memory cards may be relatively slow because card slots have narrow interfaces that limit the rate at which data can be read. Loading the data onto disk or into system memory may speed up the process but may also be relatively slow when the system is in a reduced power mode due to lengthy power up sequences that occur when the disk or system memory requires more power.

In addition, loading a memory card and having the system processor immediately detect the memory card requires the system to be fully operational. Power is wasted when the system cannot go into standby mode or is brought out of standby mode. The wasted power may be significant in battery-powered mobile devices such as laptops and mobile telephones.

In accordance with one embodiment, a method for detecting memory cards in a computing environment is provided. The method comprises detecting insertion of a memory card into a device's card slot; creating a memory card construct in a non-volatile memory storage; copying data from the memory card to the memory card construct; and informing the device that a new memory card has been inserted and may be accessed from the non-volatile memory storage.

The method may further comprise indicating that the memory card is in use, in response to determining that data is being copied from the memory card to the non-volatile memory storage.

In one embodiment, the memory card may be detected and loaded into the non-volatile memory storage while the device is fully operational. In another embodiment, the memory card may be detected and loaded into the non-volatile memory storage while the device is in a reduced power state. For example, the reduced power state may be a standby mode designated for the device and may be approximately S1 or a mode that uses less power than S1. The informing may be postponed until the device is fully operational.

In accordance with another embodiment, a system comprising one or more logic units is provided. The one or more logic units are configured to perform the functions and operations associated with the above-disclosed methods.

One or more of the above-disclosed embodiments, in addition to certain alternatives, are provided in further detail below with reference to the attached figures. The invention is not, however, limited to any particular embodiment enclosed.

Referring to FIG. 1, in accordance with one embodiment, exemplary system 100 comprises an enclosure housing one or more processors 110, dynamic random access memory (DRAM) 120, control hubs 130, nonvolatile (NV) memory storage 150 disposed within the enclosure, removable memory card 160, and rotating media 170. Rotating media 170 may comprise a hard disk drive (HDD) or an optical disk drive (ODD) depending on implementation. The system 100 may include two or more power modes including at least a full power mode and a power saving mode.

Processor(s) 110 may be connected to DRAM 120 by way of DRAM connection 115, and to controller hubs 130 by way of chipset-cpu connection 125, respectively. Control hubs 130 may be connected to NV memory storage 150 by way of NV connection 145, to removable memory card 160 by way of memory card connection 155, and to rotating media 170 by way of serial advanced technology attachment (SATA) 165, respectively. Control hubs 130 may comprise input/output or I/O control hub (ICH) 135 and peripheral component interconnect or PCI control hub (PCH) 140, for example.

Figure 2:
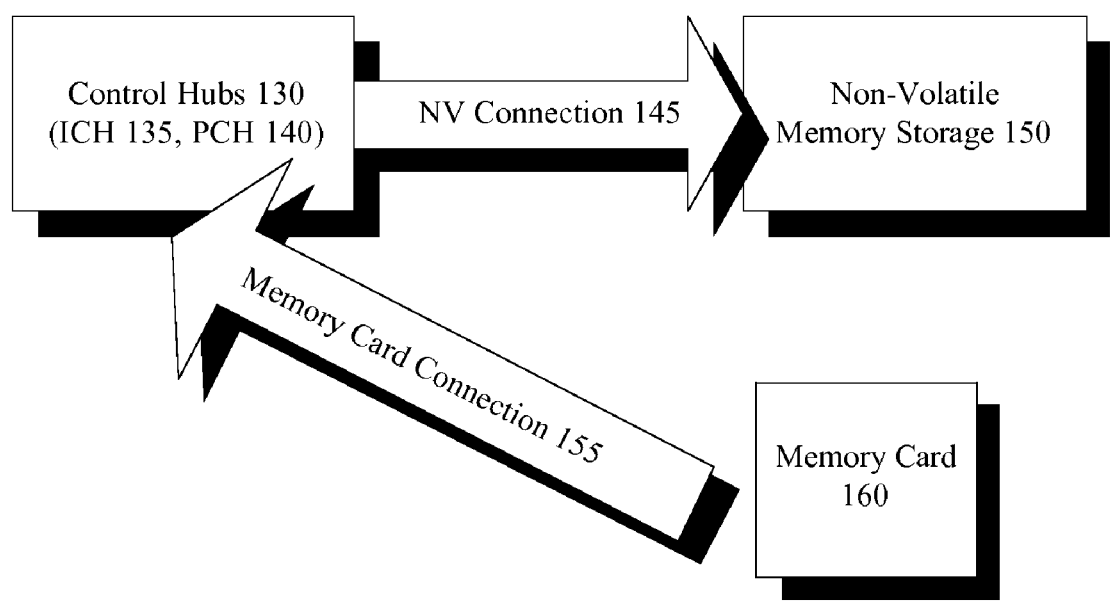
FIG. 2 is a block diagram that illustrates how data flows between the system's components, in accordance with one embodiment.

In accordance with one embodiment, data may be loaded from memory card 160 to NV memory storage 150, in response to memory card 160 being inserted into system 100's card slot, as shown in FIG. 2, even when the system 100 is in the power saving mode and without changing the power mode. The data flows from memory card 160 to NV memory storage 150 through control hubs 130. More particularly, referring to FIGS. 2 and 3, the insertion of memory card 160 is detected by ICH 135 (S310). A memory card construct or representation is created in NV memory storage 150 by PCH 140 (S320). The data from memory card 160 is then copied onto the memory card construct in NV memory storage 150 by PCH 140 (S330).

In one embodiment, system 100 is configured to conserve power by going into different modes or states (e.g., fully operational, standby mode S1-S3, in hibernation, or completely off). In standby mode S1, system 100 appears off and is powered down. Processor(s) 110 is stopped but still has power, and DRAM 120 is refreshed or updated regularly. In standby mode S2, system 100 is powered down even more than in S1. Processor(s) 110 is turned off, but DRAM 120 is still being refreshed. In standby mode S3, DRAM 120 is in slow refresh, and the power supply is in a reduced power mode. In hibernation, DRAM 120 is turned off. Components that are powered down run on low power, while components that are turned off do not use any power.

Copying the data to rotating media 190 or to DRAM 120 may cause system 100 to come out of standby mode because the system needs more power. With the new capabilities of control hubs, however, system 100 may copy data into NV memory storage 150 instead of rotating media 190 or DRAM 120 and conserve power by remaining in a standby mode (e.g. S1). System 100 may also stay in any other mode that uses less power than S1 such as S2, S3. Of course, if the system 100 is in the fully operational mode the system 100 may remain in the fully operational mode. Power savings may still be obtained in the fully operational mode, for example, if the rotating media 190 does need to spin up for the data transfer.

Figure 3:
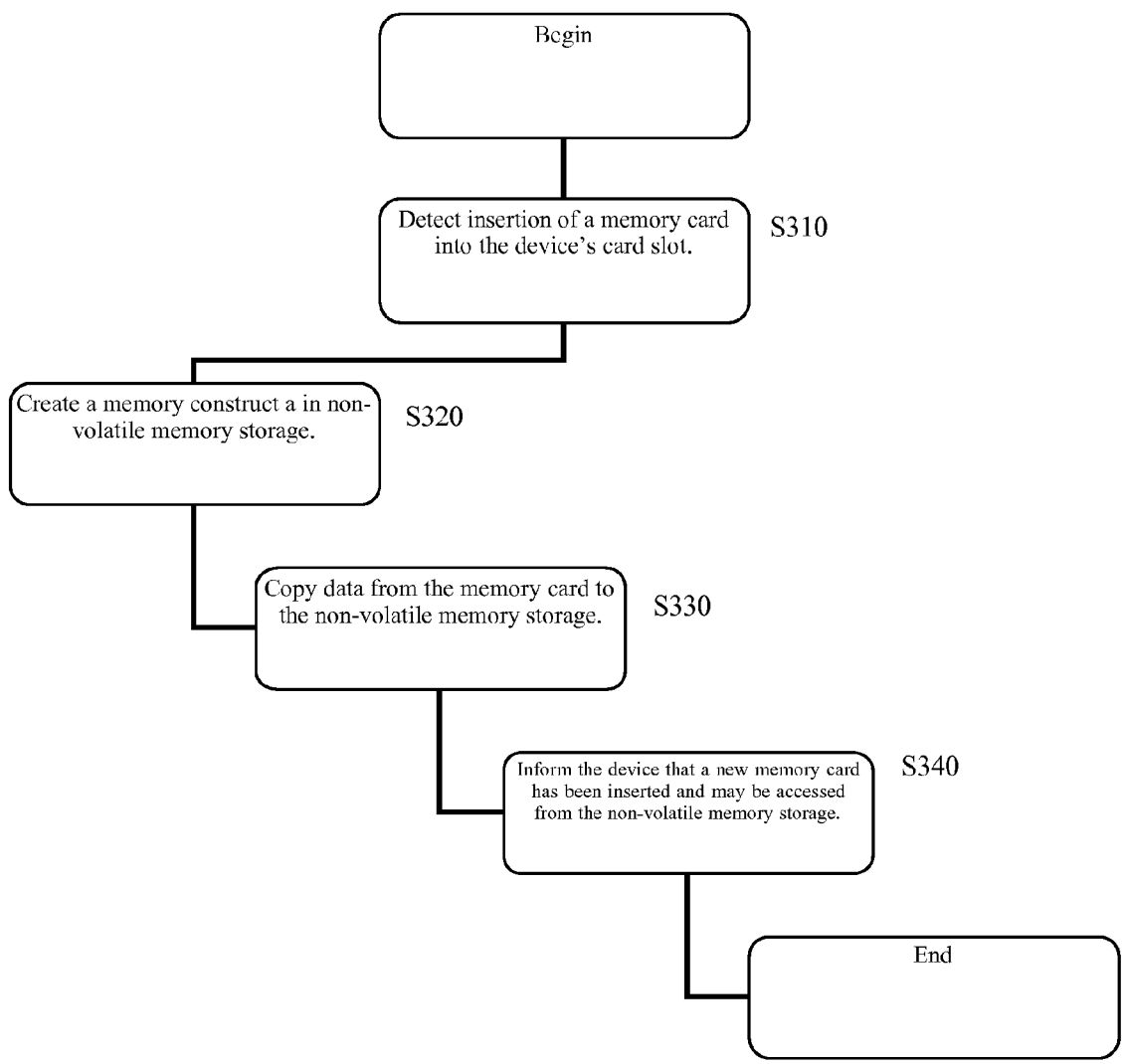
FIG. 3 is a flow diagram of a method for loading memory cards using non-volatile memory, in accordance with one embodiment.

Still referring to FIGS. 2 and 3, once the data has been loaded into NV memory storage 150, PCH 140 may inform processor(s) 110 that memory card 160 has been inserted and may be accessed from NV memory storage 150 (S340). Processor(s) 110 may detect memory card 160 after system 100's user takes the system out of standby mode. Processor(s) 110 may then access the data in memory card 160 by way of the memory construct in NV memory storage 150. The data may be accessed faster from NV memory storage 150 than from memory card 160 because connecting to NV memory storage 150 through NV connection 145 may be faster than connecting to memory card 160 through memory card connection 155, the card slot interface.

In accordance with another embodiment, PCH 140 is responsible for visually indicating (e.g. by way of an LED or mechanical interlocks) that memory card 160 is in use while data is being copied from memory card 160 to NV memory storage 150. Giving a visual indication that memory card 160 is in use prevents memory card 160 from being removed from the card slot while the data is being copied. Once the data is transferred, a visual indication may be provided that the removable memory card 160 may be safely removed from the system 100.

It should be understood that depending on implementation one or more embodiments may be practiced in form of logic code, programs, modules, processes, and methods. The order in which the respective elements of each method are performed are purely exemplary. Depending on the implementation, they may be performed in any order or in parallel, unless indicated otherwise in the present disclosure. Further, the logic code is not related, or limited to any particular programming language, and may comprise one or more modules that execute on one or more processors in a distributed, non-distributed, or multiprocessing environment.

Therefore, it should be understood that the invention can be practiced with modification and alteration within the spirit and scope of the appended claims. The description is not intended to be exhaustive or to limit the invention to the precise form disclosed. These and various other adaptations and combinations of the embodiments disclosed are within the scope of the invention and are further defined by the claims and their full scope of equivalents.

What is claimed is:

1. A method for loading data from a memory card removably coupled to a computing system, the method comprising:

creating a memory construct in a non-volatile memory storage medium coupled to a computing system, in response to detecting coupling of a removable memory card to a memory card slot of the computing system while the computing system is in a power saving mode, wherein the memory construct is associated with the memory card and the detecting is performed by, an input/output control hub (ICH) connected to the memory card and the non-volatile memory storage medium; and copying data from the memory card to the non-volatile memory storage medium by way of a peripheral component interconnect (PCI) hub connected to the memory card slot and the non-volatile memory storage medium, while the computing system remains in the power saving mode and without involving the computing system's internal memory.

2. The method of claim 1 further comprising informing a processor of the computing system by way of the PCI hub that the memory card is detected and is accessible via the memory construct in the non-volatile memory storage medium.

3. The method of claim 2, wherein in the power saving mode the processor is powered but not operational.

4. The method of claim 2, wherein in the processor accesses the data copied from the memory card to the non-volatile memory storage medium via the memory construct.

* * * * *